(12) United States Patent
Washino et al.

(10) Patent No.: US 6,195,054 B1
(45) Date of Patent: Feb. 27, 2001

(54) IC CARD WITH ANTENNA (75) Inventors: Kiyoshi Washino; Akihiro Tochi, both of Kanagawa (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 09/543,010

(22) Filed: Apr. 4, 2000

(30) Foreign Application Priority Data

Apr. 13, 1999 (JP) .................................................. 11-105723

(51) Int. Cl.[7] ........................................................ H01Q 9/26
(52) U.S. Cl. ............................................ 343/702; 361/737
(58) Field of Search ............................ 343/702; 439/108, 439/607; 361/737; 710/62

(56) References Cited

U.S. PATENT DOCUMENTS

| | | | | |
|---|---|---|---|---|
| 4,940,992 | * | 7/1990 | Nguyen et al. | 343/803 |
| 5,846,092 | | 12/1998 | Feldman et al. | 439/76.1 |
| 5,847,932 | * | 12/1998 | Kantner | 361/737 |
| 6,018,461 | * | 1/2000 | Biermann et al. | 361/737 |
| 6,115,762 | * | 9/2000 | Bell et al. | 710/62 |

FOREIGN PATENT DOCUMENTS

| | | |
|---|---|---|
| 5-201184 | 8/1993 | (JP) . |
| UM7-18495 | 3/1995 | (JP) . |
| 7-101189 | 4/1995 | (JP) . |
| 4-49236 | 5/1995 | (JP) . |
| 8-5267 | 1/1996 | (JP) . |
| 8-267971 | 10/1996 | (JP) . |
| 2593221 | 12/1996 | (JP) . |
| 9-153121 | 6/1997 | (JP) . |
| 9-246832 | 9/1997 | (JP) . |
| 10-884 | 1/1998 | (JP) . |
| 10-145832 | 5/1998 | (JP) . |

* cited by examiner

Primary Examiner—Don Wong
Assistant Examiner—James Clinger
(74) Attorney, Agent, or Firm—Rader, Fishman & Grauer (57) ABSTRACT

An IC card with an antenna including a frame for defining an internal space containing a circuit board and having an antenna mounting end surface, an antenna mounting portion provided in the vicinity of the antenna mounting end surface and having antenna mounting grooves formed in the frame, an antenna mounted on the antenna mounting portion, and an antenna fixing member joined to the antenna mounting portion. The antenna has an antenna main body arranged on the antenna mounting end surface, slip-off preventing members respectively engaged with antenna mounting grooves, and a connecting member electrically connected to the circuit board.

14 Claims, 9 Drawing Sheets

IC CARD WITH ANTENNA

BACKGROUND OF THE INVENTION

1. Field of the Invention

The present invention relates to an IC card with an antenna.

2. Description of Related Art

Data exchange between portable information equipment represented by a notebook personal computer or an electronic notebook, for example, and equipment such as a desktop personal computer is generally carried out using a dedicated cable or infrared rays.

When the dedicated cable is used, however, time and labor required to connect the cable to both equipments are complicated. Since the distance at which communication is possible is limited in data communication using infrared rays, infrared transmitter-receivers must be brought near to each other. Even if the data communication using infrared rays is not more complicated than the cable connection, therefore, it is not necessarily data exchange means which is easy to utilize.

Therefore, a system for connecting information equipments by radio has been proposed.

An IC card having a radio function has been proposed in order to establish data communication by radio. That is, the IC card is mounted on an IC card slot in the information equipment, thereby realizing radio data transmission which is not so complicated as the cable connection and in which a restriction on the communication distance is significantly relaxed.

SUMMARY OF THE INVENTION

Such an IC card comprises an antenna for radio communication. In this case, it is preferable that the antenna is provided on one end surface of an IC card exposed from a card slot. Therefore, it is preferable that the shape of the antenna is small in size and is in a longitudinal thin plate shape.

On the other hand, in order to establish good communication, strict dimensional precision is required for the small-sized and longitudinal thin plate-shaped antenna. Consequently, it is preferable that an antenna mounting structure is devised such that the antenna is not deformed at the time of and after mounting.

The antenna mounted on the end surface of the IC card must be directly electrically connected to a circuit board contained in an internal space of the IC card. In order to achieve such connection in a limited space inside the IC card, however, it is preferable that a connecting structure between the antenna and the circuit board is as simple as possible.

An object of the present invention is to provide an IC card with an antenna which can realize good communication by preventing the antenna from being deformed.

An IC card with an antenna in the present invention comprises a frame for defining an internal space containing a circuit board and having an antenna mounting end surface; an antenna mounting portion provided in the vicinity of the antenna mounting end surface and having a plurality of antenna mounting grooves formed from the antenna mounting end surface toward the internal space; an antenna having an antenna main body arranged on the antenna mounting end surface, slip-off preventing members projecting from the antenna main body and respectively engaged with the plurality of antenna mounting grooves, and a connecting member projecting from the antenna main body and electrically connected to the circuit board; and an antenna fixing member covering the antenna mounting grooves with which the slip-off preventing members are respectively engaged and joined to the antenna mounting portion.

The IC card generally has a circuit board on which an IC is mounted, a frame for defining an internal space containing the circuit board, a pair of panels respectively covering upper and lower surfaces of the circuit board, and a connecting mechanism for connection to the information equipment. In this case, the connecting mechanism may be a connector for exchanging an electrical signal with the information equipment by contact-connection or a non-contact type connecting mechanism for transmitting and receiving a signal to and from the information equipment by magnetic coupling.

The antenna main body may be in a longitudinal shape extending along the antenna mounting end surface. In this case, it is preferable that the plurality of antenna mounting grooves are spaced apart from each other along the length of the antenna mounting end surface.

The antenna main body may be one extending from one end to the other end of the antenna mounting end surface, or may be one having a length which is approximately one-third to one-second the entire length of the antenna mounting end surface. In addition thereto, the shape and the size of the antenna main body can be changed depending on necessary communication conditions. For example, it may be a pair of parallel line-shaped members extending along the length of the antenna mounting end surface.

Since the antenna slip-off preventing member and the antenna mounting groove are engaged with each other, they respectively have shapes aligned or matched with each other. It is preferable that the slip-off preventing members are respectively provided in at least the vicinities of both ends of the antenna main body when the antenna main body is longitudinal, and it is more preferable that the slip-off preventing members are respectively provided at both ends and the center of the antenna main body.

According to the present invention, the antenna slip-off preventing member is engaged with the antenna mounting groove, and such engagement is performed in a plurality of portions on the antenna mounting end surface, so that the mounting of the antenna on the frame is achieved. Even if the antenna main body is in a thin plate shape or a longitudinal shape, therefore, the antenna main body is not deformed.

Moreover, the antenna mounting groove is covered with the antenna fixing member provided separately from the frame. Consequently, at the time of mounting the antenna, the antenna slip-off preventing members are respectively fitted in the antenna mounting grooves in an opened state, and the antenna fixing member is then joined to the frame. Consequently, the mounting of the antenna can be achieved without giving large stress to the antenna main body. Therefore, it is possible to prevent the antenna (particularly, the antenna main body) from being deformed at the time of the mounting.

For example, if the antenna mounting groove is formed so as to be accessible from a direction approximately perpendicular to a main surface of the IC card (a direction along the antenna mounting end surface), the slip-off preventing member can be formed in an arbitrary shape. Consequently, it is possible to effectively exhibit the respective functions of preventing the antenna from slipping off and being deformed.

The antenna can be thus prevented from being deformed at the time of and after the mounting. Accordingly, a good communication state can be achieved.

On the other hand, a connecting member electrically connected to the circuit board projects from the antenna main body. The mounting of the antenna is achieved by fixing to the frame the antenna fixing member provided separately from the frame, so that the connecting member can have an arbitrary shape. Consequently, it is possible to cause the connecting member itself to have a pressing function against a conductor on the circuit board. Accordingly, it is possible to simplify a connecting structure between the antenna and the circuit board.

For example, it is preferable that the connecting member is a pressing member which is pressed against the circuit board. Particularly, the connecting member is preferable if it is given a pressing force by elastic deformation. Consequently, a reliable electrical connection between the circuit board and the antenna can be achieved in significantly simple construction.

Furthermore, in the construction of the present invention, an assembly of the frame, the antenna, and the antenna fixing member can be handled as one component after the antenna is mounted. Accordingly, the substantial number of components is small, thereby making it possible to simplify the assembling process in assembling the IC card.

It is preferable that the frame and the antenna fixing member are composed of resin. In this case, it is preferable that the frame and the antenna fixing member are joined to each other by ultrasonic welding. The frame and the antenna fixing member may, of course, be joined to each other by another means such as adhesion.

It is preferable that the slip-off preventing member has an extending portion extending in a direction at a predetermined angle to a direction perpendicular to the antenna mounting end surface.

According to this construction, the antenna is engaged with the antenna mounting portion more firmly by the function of the extending portion at a predetermined angle to the direction perpendicular to the antenna mounting end surface. Consequently, it is possible to reliably prevent the antenna from slipping off and being deformed.

It is preferable that the predetermined angle is approximately 90°. Consequently, it is possible to more reliably prevent the antenna from slipping off and being deformed.

The extending portions formed in at least a pair of slip-off preventing members (which may be adjacent to each other, or may not be adjacent to each other) out of the plurality of slip-off preventing members are formed in different directions. Consequently, the antenna can be mounted more firmly.

More specifically, the slip-off preventing member may further have a base extending toward an internal space of the IC card from the antenna main body, and a front end of the base may be bent to form the extending portion.

It is preferable that the slip-off preventing member is pressed into the antenna mounting groove.

According to this construction, the slip-off preventing member is pressed into the antenna mounting groove, so that the slip-off preventing member and the antenna mounting groove are engaged with each other in a state where there is no displacement. Consequently, the antenna main body does not slide on the antenna mounting end surface. Further, it is possible to prevent the antenna main body from being deformed more reliably.

In a preferred embodiment of the present invention, the IC card with an antenna further comprises a pair of panels mounted on the frame and respectively covering upper and lower surfaces of the circuit board. One of the pair of panels is integrated with the frame by simultaneous molding, for example, and has a first locking member projecting toward the internal space from an inner wall of the frame, and the other one of the pair of panels has a second locking member engaged with the first locking member inside the frame.

According to this construction, the frame in which the antenna is incorporated and the first panel can be handled as one component. Therefore, the number of components to be assembled can be further reduced. Consequently, the IC card with an antenna can be easily assembled.

Since the first panel is integrated with the frame by simultaneous molding, for example, the amount of projection of the first locking member in the first panel from the inner wall of the frame can be defined with high precision, and the amount of elastic deformation of the first panel at the time of engaging the first and second locking members is very small. Consequently, the first locking member is hardly displaced. Accordingly, the first and second locking members are easily aligned with each other at the time of the engagement. Further, the first locking member and the second locking member can be engaged with each other easily and reliably.

The foregoing and other objects, features, aspects and advantages of the present invention will become more apparent from the following detailed description of the present invention when taken conjunction with the accompanying drawings.

DESCRIPTION OF THE PREFERRED EMBODIMENTS

In an embodiment described below, description is made of a case where the present invention is applied to a CF card. However, the present invention is also applicable to an IC card conforming to another standard, for example, a PC card or a small PC card.

Figure 1:
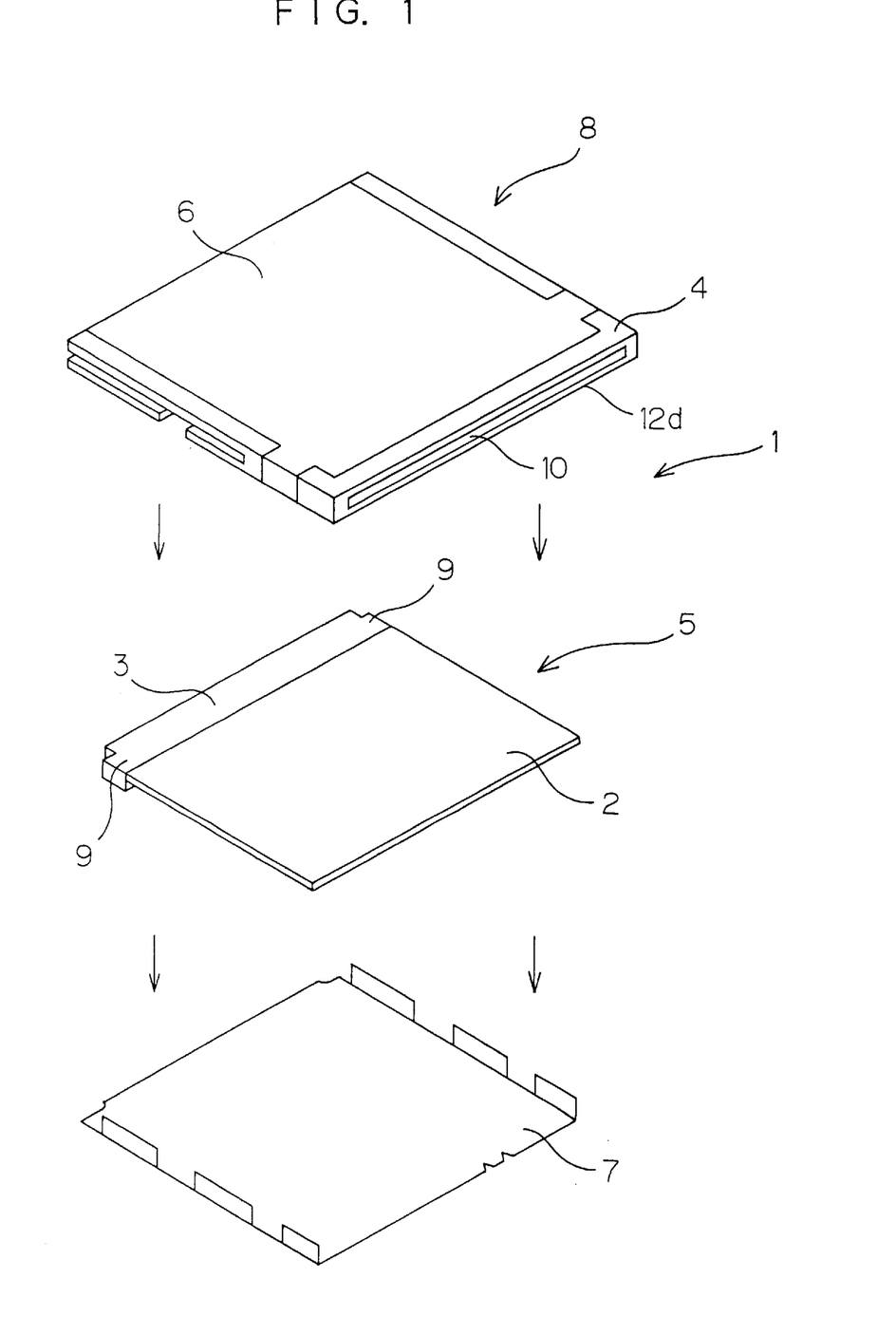
FIG. 1 is an exploded perspective view of a CF card with an antenna according to an embodiment of the present invention.

FIG. 1 an exploded perspective view showing the construction of a CF card 1 with an antenna according to an embodiment of the present invention. Referring to FIG. 1, the CF card with an antenna 10 comprises a circuit board assembly 5, a frame 4 for defining an internal space of the CF card 1 and holding the circuit board assembly 5, a first panel 6 for covering an upper surface of the circuit board assembly 5, and a second panel 7 for covering a lower surface of the circuit board assembly 5. The circuit board assembly 5 has a printed circuit board 2 and a connector 3 attached to a front end of the printed circuit board 2.

The first panel 6 is positioned above the printed circuit board 2 in a state where the CF card 1 is normally used. The first panel 6 and the frame 4 are integrated with each other by simultaneous molding, thereby constituting a frame panel assembly 8. Further, a longitudinal antenna 10 is provided on a rear end surface 12d (an antenna mounting end surface) of the frame 4.

The CF card 1 is inserted into a CF card slot (not shown) in portable information equipment, for example, to establish radio data communication with a desktop personal computer, another portable information equipment, a printer, and so forth.

The connector 3 is used for the electrical connection between the CF card slot and the printed circuit board 2, and comprises a pair of first projections 9 in its side parts. Description is now made by taking the side of the connector 3 connected to the CF card slot as the front side of the CF card 1.

The connector 3 has a plurality of contacts (not shown) projecting backward. The contacts are soldered to the bottom surface of the printed circuit board 2. The mounting of the connector 3 on the printed circuit board 2 is achieved by the soldering.

Figure 2:
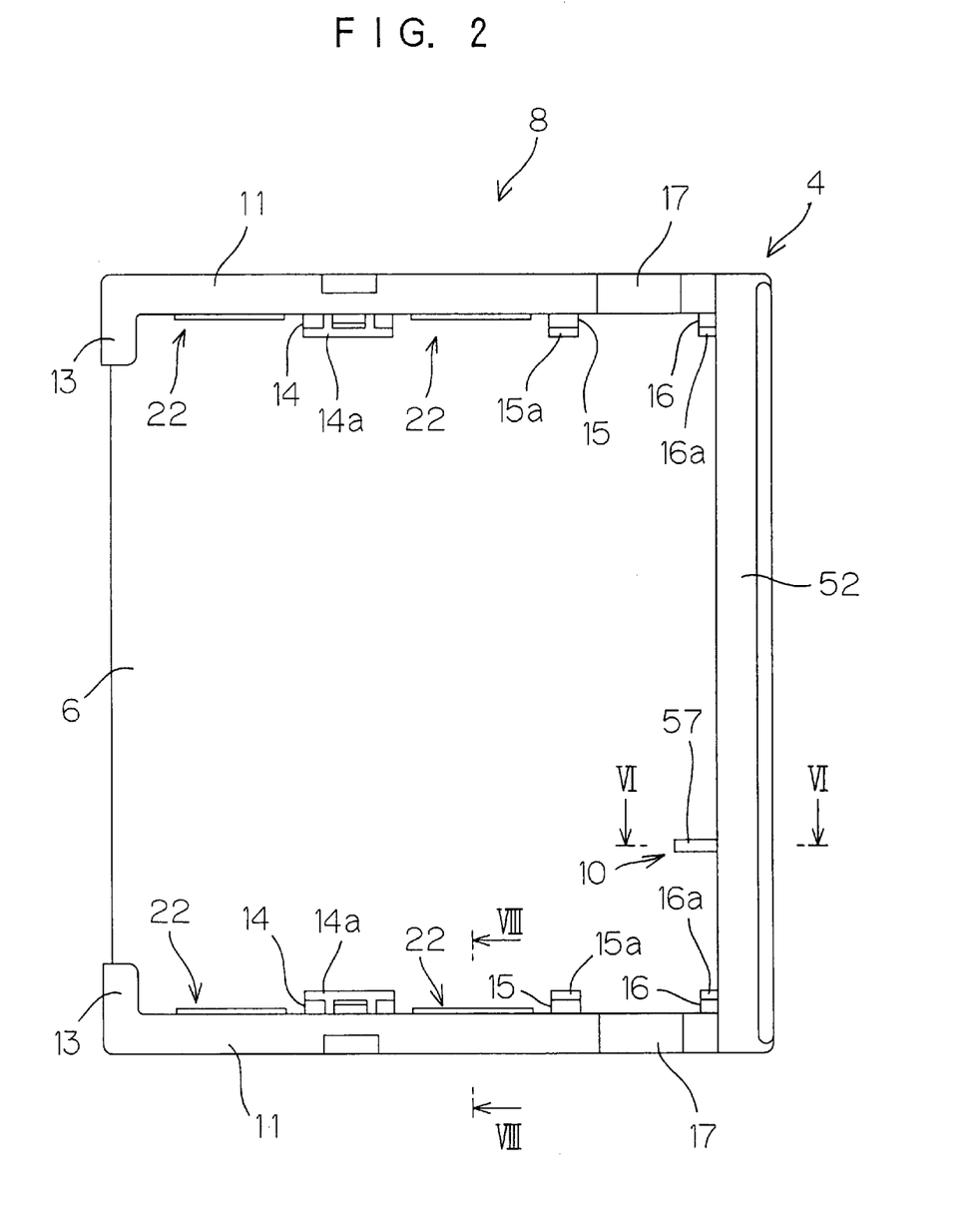
FIG. 2 is a bottom view of a frame panel assembly.

FIG. 2 is a bottom view of the frame panel assembly 8. The frame panel assembly 8 is obtained by integrating the first panel 6 composed of a conductive plate in an approximately rectangular shape with the frame 4 by simultaneous molding, as described above. For example, it is formed by injection molding the frame 4 on the first panel 6.

The frame 4 has an approximately U shape, and defines an internal space of the CF card 1 in its inner part. The frame 4 comprises a pair of opposite side beams 11 and a rear end beam 12 (see FIG. 3) for connecting respective rear ends of the side beams 11.

An engaging projection 13 projecting inward is formed at a front end of each of the side beams 11. The paired engaging projections 13 are respectively engaged with the first projections 9 of the connector 3 to hold the connector 3 in containing the circuit board assembly 5 in the frame panel assembly 8.

A second projection 14 projecting inward is provided in a position near the front of each of the side beams 11 a little beyond the center thereof. Further, a third projection 15 is provided in a position near the rear of each of the side beams 11 a little beyond the center thereof. A fourth projection 16 is provided at a rear end of each of the side beams 11. Engaging portions 14a, 15a, and 16a for holding the printed circuit board 2 are respectively formed on upper surfaces of the second, third, and fourth projections 14, 15, and 16. A conductive portion 17 is provided in the vicinity of the rear end of each of the side beams 11. The conductive portion 17 is obtained by winding a metal member extending downward from the first panel 6 around the side beam 11.

First locking members 22 are provided in two portions spaced apart from each other in each of the side beams 11 in the frame 4.

The antenna 10 is mounted on the rear end beam 12 in the frame 4. The rear end beam 12 is covered with an antenna fixing member 52 from below.

Figure 3:
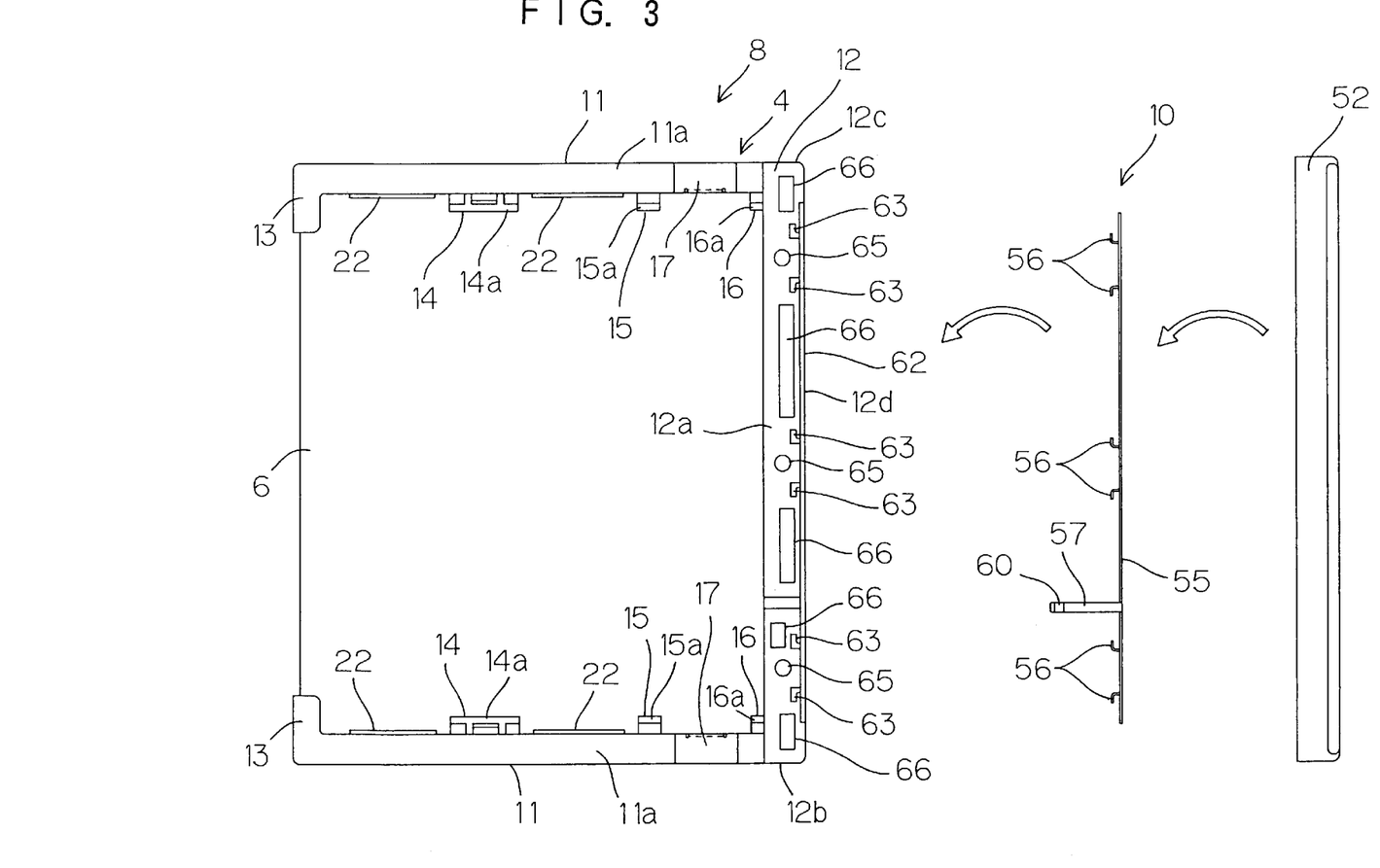
FIG. 3 is an exploded bottom view of the frame panel assembly.

FIG. 3 is an exploded bottom view of the frame panel assembly 8. Referring to FIGS. 2 and 3, a lower surface 12a (an antenna mounting portion) of the rear end beam 12 in the frame 4 forms a step which is lower than a lower surface 11a of the side beam 11 and extends over the whole area from one end 12b to the other end 12c. An antenna main body containing groove 62 and a plurality of antenna mounting grooves 63 are provided on the lower surface 12a of the rear end beam 12. Further, a plurality of positioning holes 65 and a plurality of positioning grooves 66 are respectively provided.

The antenna main body containing groove 62 extends from the vicinity of the one end 12b to the vicinity of the other end 12c along a rear end surface 12d. The antenna mounting grooves 63 are formed inward from the antenna main body containing groove 62, and are spaced apart from one another along the length of the antenna main body containing groove 62. More specifically, three pairs of antenna mounting grooves 63 are respectively provided in the vicinities of both ends of the antenna main body containing groove 62 and the vicinity of the center thereof.

The antenna 10 comprises a longitudinal antenna main body 55, a plurality of (six, for example, in the present embodiment) slip-off preventing members 56 projecting from the antenna main body 55, and a connecting member 57 projecting from the antenna main body 55. The connecting member 57 is an elastic member extending forward, and a pressing portion 60 formed downward in a convex shape is provided at a front end of the connecting member 57. The plurality of slip-off preventing members 56 are spaced apart from one another along the length of the antenna main body 55. That is, three pairs of slip-off preventing members 56 are respectively provided in the vicinities of both ends of the antenna main body 55 and the vicinity of the center thereof.

Figure 4:
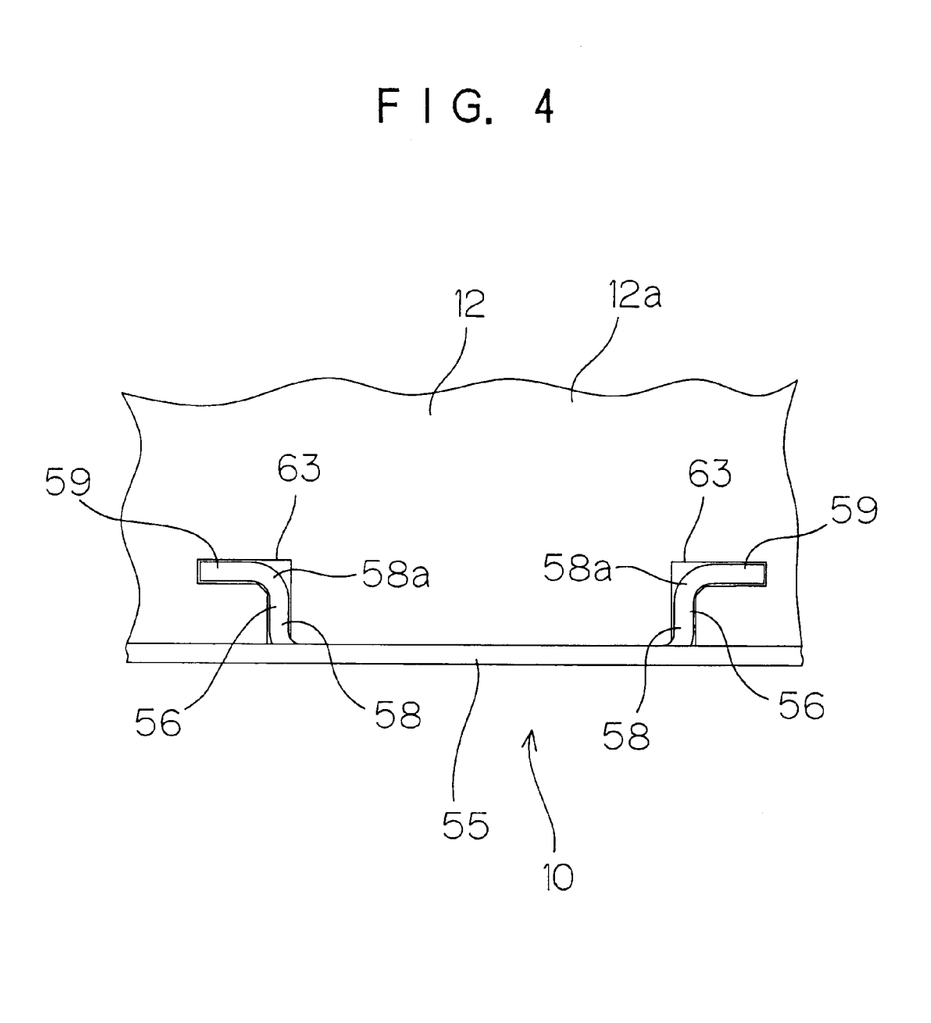
FIG. 4 is a partially enlarged bottom view showing a state where the antenna is mounted on a rear end beam.

FIG. 4 is a partially enlarged bottom view showing a state where the antenna 10 is attached to the rear end beam 12. The slip-off preventing member 56 is provided by raising a part of the antenna main body 55 forward. The slip-off preventing member 56 has a base 58 extending from the antenna main body 55 toward the internal space of the CF card with an antenna 10, and an extending portion 59 bent from a front end 58a of the base 58. The extending portion 59 is bent at approximately 90° with respect to the base 58. The respective extending portions 59 of the pair of adjacent slip-off preventing members 56 are alternately directed in opposite directions, and the pair of slip-off preventing members 56 take a "ハ" shape. The antenna mounting groove 63 is in a shape aligned with the slip-off preventing member 56. The slip-off preventing member 56 is pressed into the antenna mounting groove 63 from a direction approximately perpendicular to a main surface of the CF card 1.

Figure 5A:
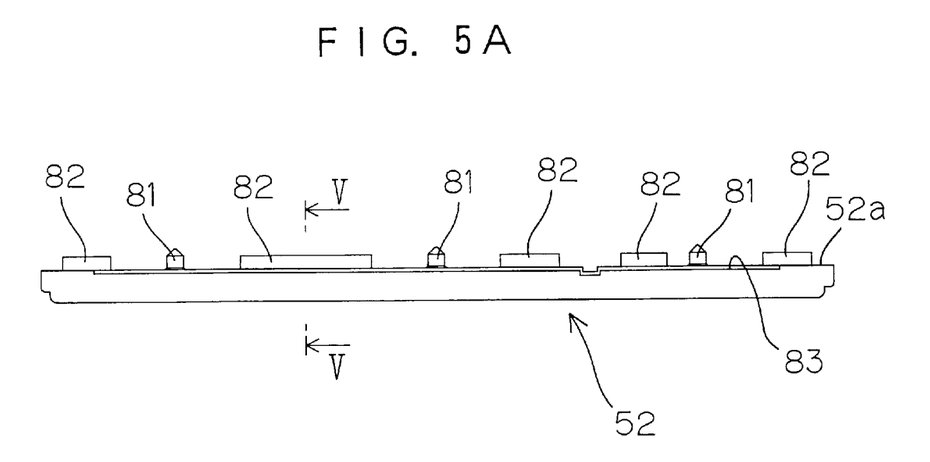
FIGS. 5A and 5B are diagrams for explaining the construction of an antenna fixing member.
Figure 5B:
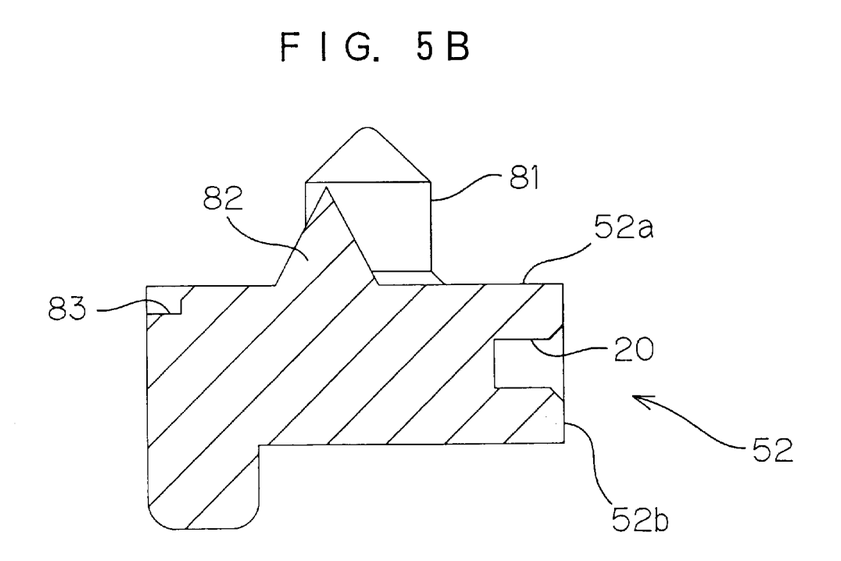

FIG. 5A is a diagram showing the antenna fixing member 52 as viewed from the rear, and FIG. 5B is a cross-sectional view taken along a line V—V shown in FIG. 5A.

The antenna fixing member 52 is a longitudinal member which is approximately rectangular in cross section, and is composed of a resin molded product. A plurality of first positioning projections 81 and a plurality of second positioning projections 82 are respectively provided on an upper surface 52a of the antenna fixing member 52. The first positioning projection 81 is formed in a columnar shape, and its front is in a conical shape. The second positioning projection 82 is a longitudinal projection which is triangular in cross section.

Grooves 20 for rotating and engaging members 32 (see FIGS. 7A and 7B) are provided on a front surface 52b of the antenna fixing member 52. A step 83 receiving a lower edge of the antenna main body 55 is formed at a rear end of the upper surface 52a.

The antenna fixing member 52 covers an antenna mounting groove 63 after the antenna 10 is mounted on the frame 4. In this case, the first positioning projection 81 and the second positioning projection 82 are respectively fitted in the positioning hole 65 and the positioning hole 66, to position the antenna fixing member 52 with respect to the frame 4. Thereafter, the antenna fixing member 52 is joined to the frame 4 by ultrasonic welding. Consequently, the frame 4 in which the antenna 10 is incorporated is obtained. The frame 4 in which the antenna 10 is incorporated is handled as one component.

Figure 6:
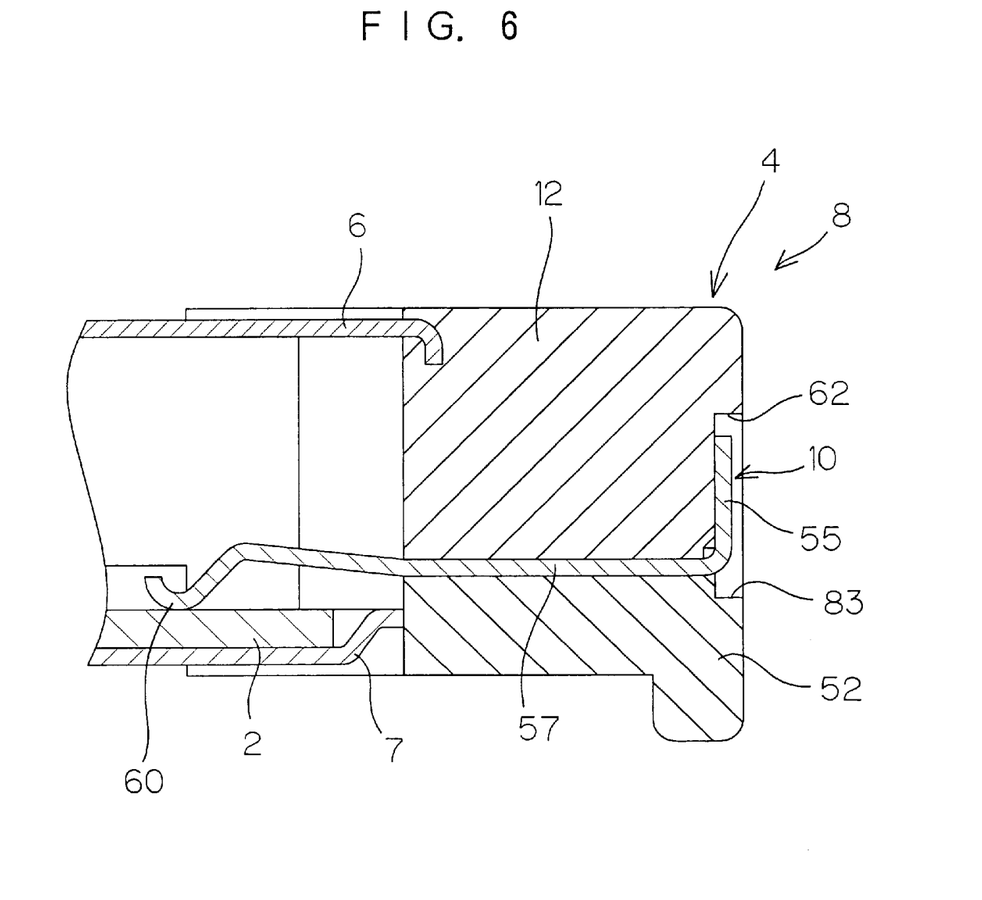
FIG. 6 is a cross-sectional view taken along a line VI—VI shown in FIG. 2.

FIG. 6 is a cross-sectional view taken along a line VI—VI shown in FIG. 2. In a state where the antenna 10 is mounted on the frame 4, and the antenna fixing member 52 is joined to the rear end beam 12, the connecting member 57 is introduced into the frame 4 through an area between the rear end beam 12 and the antenna fixing member 52. A pressing portion 60 provided at a front end of the connecting member 57 extends toward the position where the printed circuit board 2 is mounted.

Description is now made of the second panel 7.

Figure 7A:
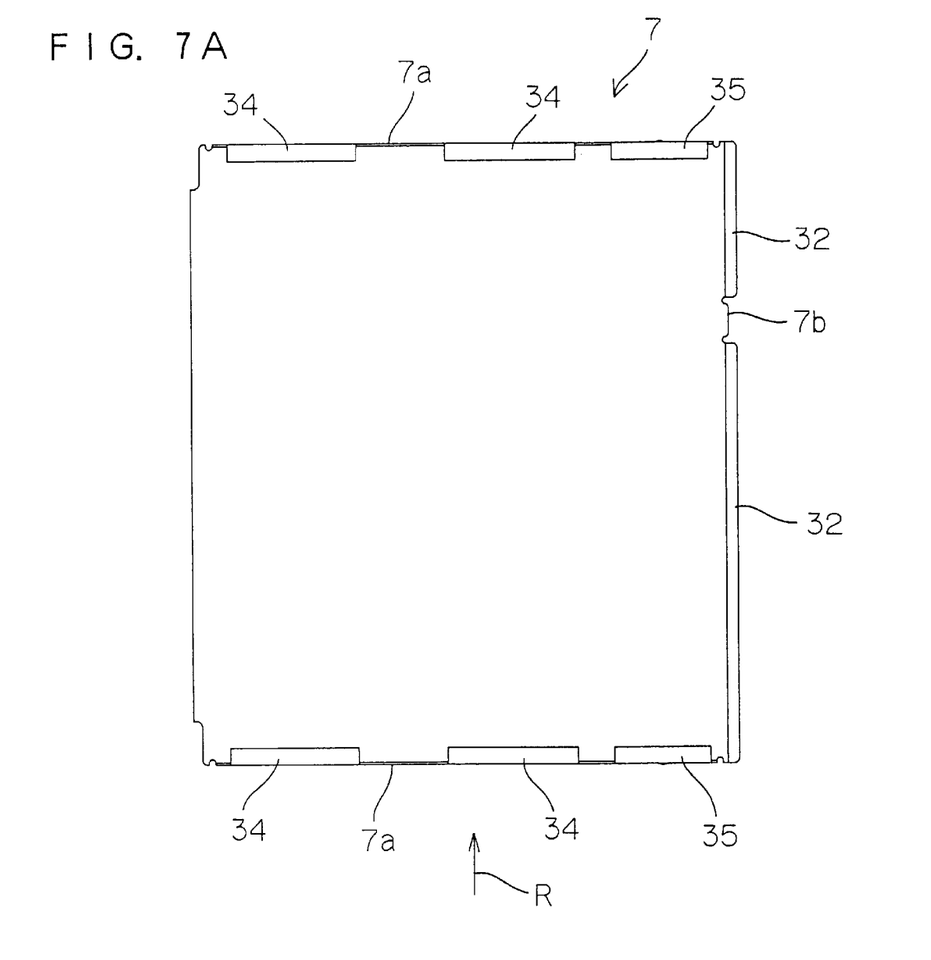
FIGS. 7A and 7B are diagrams for explaining the construction of a second panel.
Figure 7B:
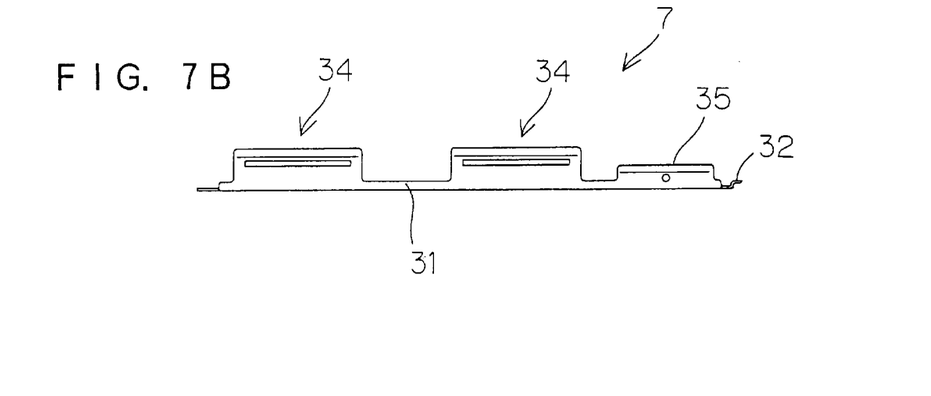

FIG. 7A is a plan view showing the construction of the second panel 7, and FIG. 7B is a side view of the second panel 7 as viewed from a direction indicated by an arrow R shown in FIG. 7A.

The second panel 7 is a plate-shaped member in an approximately rectangular shape composed of a conductive plate. The second panel 7 comprises a pair of rotating and engaging members 32 on its rear end side 7b. The paired rotating and engaging members 32 respectively have predetermined widths along the rear end side 7b, and are in shapes respectively aligned with grooves 20 formed in the frame 4.

Second locking members 34 are respectively formed in two portions on each of sides 7a. Further, a second conductive member 35 extending upward is provided in the vicinity of a rear end of each of the sides 7a.

Figure 8:
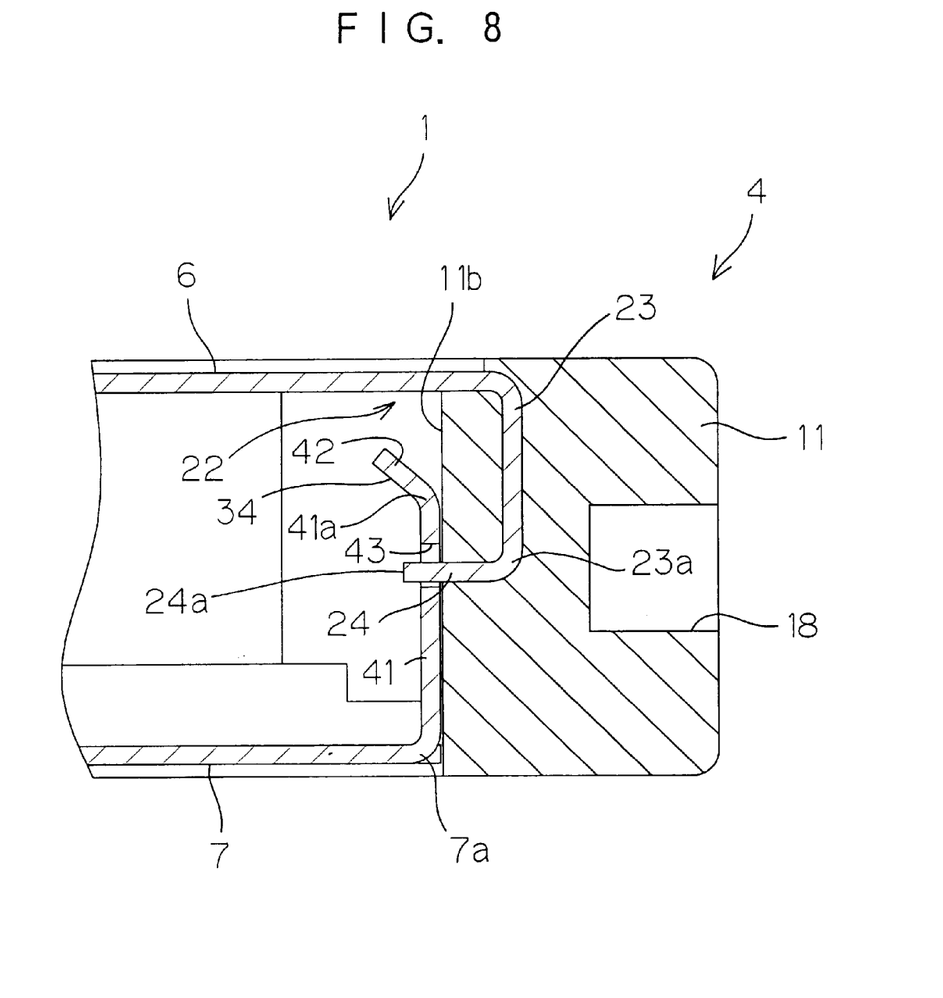
FIG. 8 is a cross-sectional view taken along a line VIII—VIII shown in FIG. 2.

FIG. 8 is a cross-sectional view taken along a line VIII—VIII shown in FIG. 2.

The first locking member 22 in the first panel 6 comprises a hanging portion 23 hanging toward the inside of the CF card 1 from a side edge of the first panel 6 and entering the side beam 11, and a locking claw 24 folded inward from a front edge 23a of the hanging portion 23. The first locking member 22 is thus implanted in the side beam 11 in the frame 4. A front end 24a of the locking claw 24 projects toward the internal space of the CF card 1 almost perpendicularly from an inner wall 11b of the side beam 11. Since the first panel 6 and the frame 4 are integrated with each other by simultaneous molding, the amount of projection of the locking claw 24 from the inner wall 11b is defined with high precision.

When the frame panel assembly 8 and the second panel 7 are coupled to each other, the first locking member 22 is engaged with a second locking member 34 provided in the second panel 7 inside the frame 4, so that both the panels 6 and 7 are coupled to each other.

On the other hand, the second locking member 34 in the second panel 7 comprises a raised portion 41 bent upward (toward the inside of the CF card 1) and molded along the inner wall 11b of the side beam 11 in the frame 4 from the side 7a of the second panel 7, a guiding portion 42 extending obliquely toward the inside of the frame 4 from a front end 41a of the raised portion 41 for guiding the locking claw 24, and an engaging hole 43 formed in the raised portion 41, to constitute an elastic member as a whole.

The procedure for assembling the CF card 1 will be described.

Figure 9:
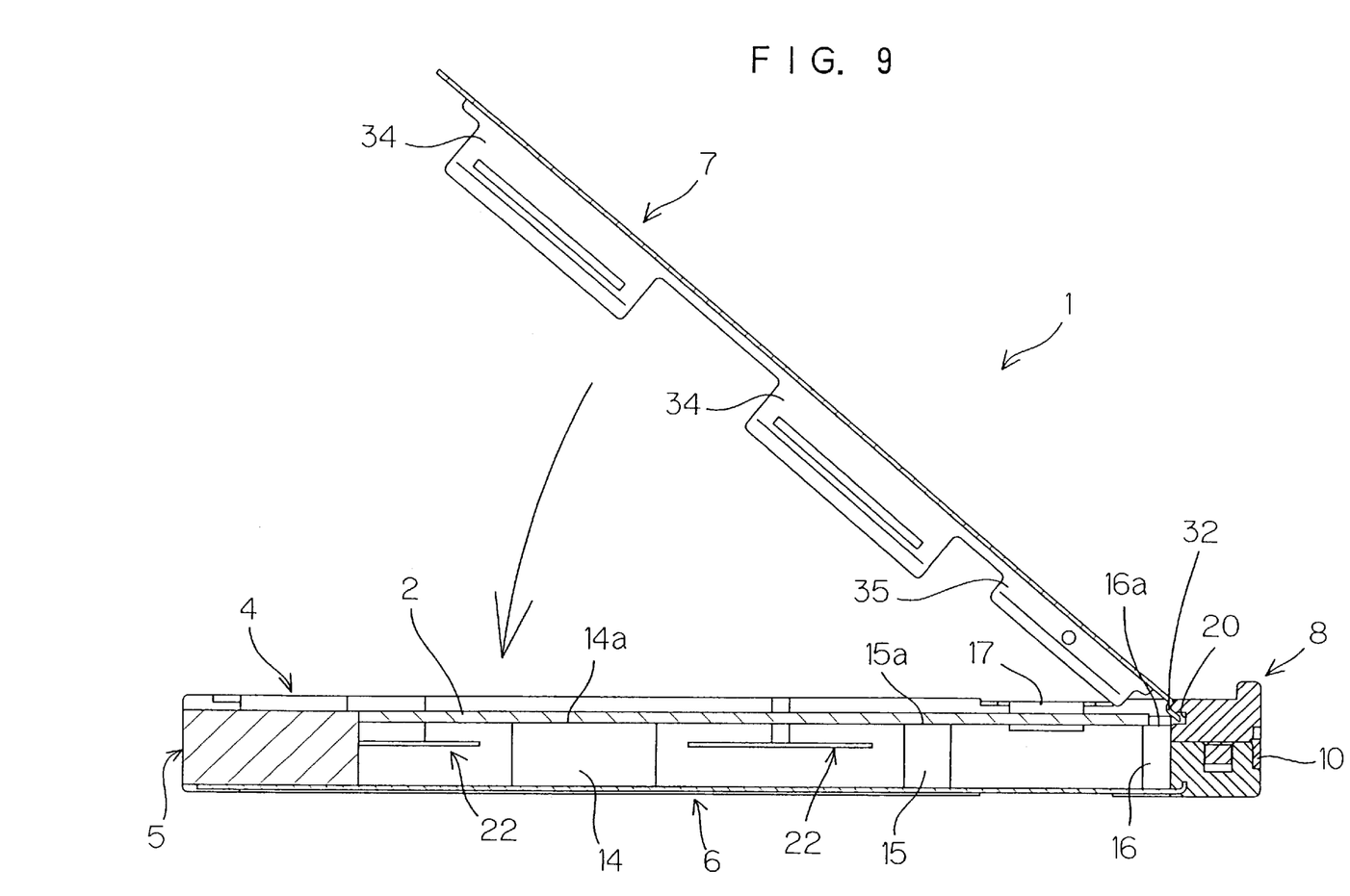
FIG. 9 is a cross-sectional view for explaining the assembling of a CF card with an antenna.

Referring to FIG. 9, the printed circuit board 2 is fitted in the engaging portions 14a, 15a, and 16a of second, third, and fourth projections 14, 15, and 16 in a state where the frame panel assembly 8 is turned over, so that the circuit board assembly 5 is held in the frame 4.

Thereafter, the pair of rotating and engaging members 32 in the second panel 7 is engaged with the grooves 20 formed in the rear end beam 12 in the frame 4 with the frame panel assembly 8 held with one of worker's hands and with the second panel 7 obliquely applied to the frame panel assembly 8 with the other hand.

The worker presses the second panel 7 against the frame 4 in such a manner that the first and second panels 6 and 7 are pressed against each other with the fingers of both the hands. Consequently, the first locking member 22 and the second locking member 34 are snap-coupled to each other, so that the first and second panels 6 and 7 are coupled to each other.

When the coupling between the second panel 7 and the first panel 6 is achieved, the printed circuit board 2 is abutted against the second panel 7 and is pressed inward, as shown in FIG. 6. Since the pressing portion 60 extends to the position where the printed circuit board 2 is mounted, as described above, a wiring conductor on the printed circuit board 2 elastically presses the pressing portion 60 of the connecting member 57 upward. Therefore, the pressing portion 60 is elastically deformed upward while being brought into contact with the wiring conductor on the printed circuit board 2. The pressing portion 60 is pressed against the printed circuit board 2 by the elastic force. Consequently, a more reliable electrical connection between the wiring conductor on the printed circuit board 2 and the antenna 10 is obtained.

Referring to FIG. 8 again, when the first panel 6 and the second panel 7 are pressed against each other, the guiding portion 42 guides the corresponding locking claw 24 to the engaging hole 43. At this time, an area in the vicinity of the raised portion 41 and the guiding portion 42 in the second panel 7 are elastically deformed toward the inside of the frame 4. On the other hand, the first locking member 22 which is implanted in the side beam 11 is hardly deformed. Therefore, the first and second locking members 22 and 34 can be aligned with each other with high precision. Thereafter, when the locking claw 24 extending inward is contained in the engaging hole 43, the raised portion 41 and the guiding portion 42 in the second panel 7 which are elastically deformed inward are respectively restored into their original shapes. The first and second locking members 22 and 34 are aligned with each with high precision, and the first locking member 22 is hardly deformed. Accordingly, both the first and second locking members 22 and 34 can be engaged with each other easily and reliably.

In a state where the first and second panels 6 and 7 and the frame 4 are coupled to each other, the second conductive portion 35 formed in the second panel 7 is abutted against the first conductive portion 17 in the opposite first panel 6, thereby obtaining stable electrical conduction between both the panels 6 and 7.

As described in the foregoing, according to the present embodiment, the slip-off preventing member 56 is pressed into and engaged with the antenna mounting groove 63, and such engagement is performed in a plurality of portions along the length of the antenna main body 55, so that the antenna 10 is mounted on the rear end beam 12. Therefore, the antenna main body 55 is free from any displacement or deformation. Accordingly, a good communication state can be achieved.

Moreover, the slip-off preventing member 56 is pressed into the antenna mounting groove 63 from a direction perpendicular to the main surface of the CF card 1. Accordingly, the shapes of the slip-off preventing member 56 and the connecting member 57 are hardly restricted. Therefore, the slip-off preventing member 56 and the connecting member 57 can have approximately ideal shapes. That is, in the present embodiment, the plurality of slip-off preventing members 56 have such shapes that the adjacent ones have the extending portions 59 directed in opposite directions, thereby making it possible to reliably prevent the antenna from slipping off. The connecting member 57 has a shape having the pressing portion 60 elastically deformed and pressed against the printed circuit board 2. The electrical connection between the antenna 10 and the printed circuit board 2 is achieved in significantly simple construction.

The antenna fixing member 52 is joined to the frame 4 after the slip-off preventing members 56 are respectively pressed into the antenna mounting grooves 63. Accordingly, no large stress is given to the antenna main body 55 at the time of mounting the antenna 10, so that the antenna main body 55 is hardly deformed. Since the antenna main body 55 is not easily deformed either at the time of or after mounting the antenna 10, therefore, a good communication state can be reliably achieved.

Furthermore, the frame 4 in which the antenna 10 is incorporated can be substantially handled as one component. Accordingly, the number of components can be made smaller, as compared with that in a case where the antenna 10 and the frame 4 are separate components. Consequently, the CF card 1 is easier to assemble.

Particularly if the first panel 6 and the frame 4 are integrated with each other by simultaneous molding, as in the present embodiment, the first panel 6 and the frame 4 can be handled as one component. In assembling the CF card 1, therefore, three components, that is, the printed circuit board 2, the frame panel assembly 8, and the second panel 7 are to be assembled. The number of components to be assembled can be thus reduced. Consequently, it is possible to easily assemble the IC card 1.

Although the present invention has been described and illustrated in detail, it is clearly understood that the same is by way of illustration and example only and is not to be taken by way of limitation, the spirit and scope of the present invention being limited only by the terms of the appended claims.

The present invention claims the conventional priority benefits of Japanese Patent Application No. 11-105723 filed with the Japanese Patent Office on Apr. 13, 1999, the disclosure of which is incorporated hereinto by reference.

What is claimed is:

1. An IC card with an antenna, comprising:
   a frame for defining an internal space containing circuit board and having an antenna mounting end surface;
   an antenna mounting portion provided in the vicinity of the antenna mounting end surface and having a plurality of antenna mounting grooves formed in the frame from the antenna mounting end surface toward the internal space;
   an antenna having an antenna main body arranged on the antenna mounting end surface, slip-off preventing members projecting from the antenna main body and respectively engaged with the plurality of antenna mounting grooves, and a connecting member projecting from the antenna main body and electrically connected to the circuit board; and
   an antenna fixing member joined to the antenna mounting portion, the antenna fixing member covering the antenna mounting grooves with which the slip-off preventing members are respectively engaged.

2. The IC card according to claim 1, wherein
the antenna main body is in a longitudinal shape extending along the antenna mounting end surface.

3. The IC card according to claim 2, wherein
the plurality of antenna mounting grooves are spaced apart from each other along the length of the antenna mounting end surface.

4. The IC card according to claim 2, wherein
the slip-off preventing members are respectively provided in at least the vicinities of both ends of the antenna main body.

5. The IC card according to claim 4, wherein
the slip-off preventing members are further provided in the vicinity of the center of the antenna main body.

6. The IC card according to claim 1, wherein
the antenna mounting groove is formed so as to be accessible from a direction approximately perpendicular to a main surface of the IC card.

7. The IC card according to claim 1, wherein
the connecting member is a pressing member which is pressed against the circuit board.

8. The IC card according to claim 1, wherein
the frame and the antenna fixing member are composed of resin, and are joined to each other by ultrasonic welding or adhesion.

9. The IC card according to claim 1, wherein
the slip-off preventing member has an extending portion extending in a direction at a predetermined angle to a direction perpendicular to the antenna mounting end surface.

10. The IC card according to claim 9, wherein
the extending portions formed in at least a pair of slip-off preventing members out of the plurality of slip-off preventing members are formed in different directions.

11. The IC card according to claim 9, wherein
the slip-off preventing member further has a base extending toward an internal space of the IC card from the antenna main body, and
a front end of the base is bent to form the extending portion.

12. The IC card according to claim 1, wherein
the slip-off preventing member is pressed into the antenna mounting groove.

13. The IC card according to claim 1, further comprising
a pair of panels mounted on the frame and respectively covering upper and lower surfaces of the circuit board,
one of the pair of panels being integrated with the frame and having a first locking member projecting toward the internal space from an inner wall of the frame, and
the other one of the pair of panels having a second locking member engaged with the first locking member inside the frame.

14. The IC card according to claim 13, wherein
one of the pair of panels and the frame are integrated with each other by simultaneous molding.

* * * * *